US 8,151,693 B2

(12) United States Patent
Sala et al.

(10) Patent No.: US 8,151,693 B2
(45) Date of Patent: Apr. 10, 2012

(54) APPARATUS FOR PREPARING BEVERAGES FROM SOLUBLE PREPARATIONS WITH IMPROVED AROMA-PRESERVING DEVICE

(75) Inventors: Dario Sala, Binasco MI (IT); Claudio Bianchi, Binasco MI (IT)

(73) Assignee: Gruppo Cimbali S.p.A., Binasco MI (IT)

( * ) Notice: Subject to any disclaimer, the term of this patent is extended or adjusted under 35 U.S.C. 154(b) by 740 days.

(21) Appl. No.: 12/325,071

(22) Filed: Nov. 28, 2008

(65) Prior Publication Data

US 2009/0190436 A1 Jul. 30, 2009

(30) Foreign Application Priority Data

Jan. 30, 2008 (EP) .................................... 08425043

(51) Int. Cl.
*A47J 31/40* (2006.01)
*B01F 13/06* (2006.01)
(52) U.S. Cl. ..................... 99/287; 99/289 R; 366/139
(58) Field of Classification Search ............... 222/129.4; 99/289 R, 287; 366/139
See application file for complete search history.

(56) References Cited

U.S. PATENT DOCUMENTS

| 2,827,845 | A | * | 3/1958 | Richeson | ........................ 99/282 |
| 3,335,911 | A | * | 8/1967 | Stutz | ............................. 222/640 |
| 3,707,905 | A | * | 1/1973 | Schwertfeger | ............. 99/289 R |
| 4,172,669 | A | * | 10/1979 | Edelbach | .................. 366/181.1 |
| 4,486,100 | A | * | 12/1984 | Endo et al. | ................. 366/76.93 |
| 4,533,123 | A | * | 8/1985 | O'Leary | ........................ 261/61 |
| 5,192,002 | A | * | 3/1993 | Reese et al. | .................... 222/108 |
| 6,237,468 | B1 | * | 5/2001 | Erikawa | ........................... 99/287 |

FOREIGN PATENT DOCUMENTS

| DE | 33 42 157 | | 5/1985 |
| DE | 29611088 | * | 1/1997 |
| GB | 1 004 814 | | 9/1965 |
| GB | 1 006 191 | | 9/1965 |
| IT | 2004IF-VR0124 | * | 7/2004 |
| IT | VR2004A000124 | | 7/2004 |

OTHER PUBLICATIONS

Derwent Abstract for Derwent-Acc-No. 2009-M41864, for Italy application VR2004A000124, 2004IT-VR0124 filed Jul. 30, 2004, Derwent week 200959, 1 page, (2009).*
European Search Report for EP Application No. 08 42 5043, dated Jun. 9, 2008, 2 pages.

* cited by examiner

*Primary Examiner* — Tony G Soohoo
(74) *Attorney, Agent, or Firm* — Nixon & Vanderhye P.C.

(57) ABSTRACT

Apparatus for preparing a beverage using a soluble preparation, comprising a container for a soluble preparation, a mixer provided with a mixing chamber, said chamber having a filling inlet for the soluble preparation, at least one opening for supplying a liquid for solubilizing the preparation and forming the beverage, a duct for evacuating any vapor and/or aerosol which forms during preparation of the beverage, said duct comprising a suction fan, as well as an opening for dispensing the prepared beverage, a centrifuging device housed inside said mixing chamber and rotationally operated by an associated electric motor positioned outside said chamber, means for conveying a predetermined quantity of soluble preparation from the said container to the filling inlet of said mixing chamber, as well as means for conveying the solubilizing liquid from the associated source to the respective opening of the mixing chamber.

The apparatus includes means for closing and opening the said duct for evacuating any vapor and/or aerosol which forms during preparation of the beverage.

3 Claims, 4 Drawing Sheets

APPARATUS FOR PREPARING BEVERAGES FROM SOLUBLE PREPARATIONS WITH IMPROVED AROMA-PRESERVING DEVICE

This application claims priority to Europe Application No. 08425043.0, filed Jan. 30, 2008, the entire contents of which is hereby incorporated by reference.

BACKGROUND OF THE INVENTION

The present invention relates to an apparatus for preparing a beverage using a soluble preparation, comprising a container for the soluble preparation, a mixer provided with a mixing chamber, said chamber having a filling inlet for the soluble preparation, at least one opening for supplying a liquid for solubilizing the preparation and forming the beverage, a duct for evacuating any vapour and/or aerosol which forms during preparation of the beverage, said duct comprising a suction fan, as well as an opening for dispensing the prepared beverage, a centrifuging device housed inside said mixing chamber and rotationally operated by an associated electric motor positioned outside said chamber, means for conveying a predetermined quantity of soluble preparation from the said container to the filling inlet of said mixing chamber, as well as means for conveying the solubilization liquid from the associated source to the respective opening of the mixing chamber. An apparatus of the type mentioned above is known from the art in the sector and is, for example, described in Italian published patent application IT VR.2004A000124, in GB patent No. 1,004.814 and in German published patent application DE 33 42 157.

As is known, during formation of the reconstituted beverage from soluble preparations, remixing of the quantity of preparation with the solubilization liquid which, in most cases, is water from a source at a suitable pressure and temperature, produces a certain evaporation of the water and the formation of aerosol.

The fine water spray and vapour produced by the centrifuging member pass out of the mixing chamber and, via the soluble-preparation filling inlet, permeate the container holding the preparation and the components for feeding the latter, greatly increasing the local moisture level.

The continuous alternation of vapour flows during dispensing and drying flows during the pauses in operation of the apparatus has the effect that part of the soluble preparation is transformed, firstly into a sticky mass, and then into a hard crust which prevents proper flowing of the preparation until blockage of the feeding means occurs, especially when these means are in the form of feeder screw or Archimedes' screw, as is conventionally used in the known art.

In order to overcome this drawback, the known art, as described in the cited prior art documents, envisages the insertion of a fan inside the vapour evacuation duct and, in case of IT VR2004A000124, also the operation of the fan by means of the same motor which causes rotation of the centrifuging member positioned inside the mixing chamber.

Although these known solutions allow aspiration of the vapour produced during formation of the beverage and conveying thereof far from the filling inlet of the mixing chamber, it nevertheless has the drawback that it operates during formation of the beverage when, inside the mixing chamber, the specific volatile aromatic and flavouring molecules of the beverage being prepared are also released and consequently removed from the beverage, adversely affecting the aroma and taste thereof.

The abovementioned drawback cannot be entirely eliminated even if, in accordance with another solution which is also known, the fan installed in the vapour evacuation duct is operated by means of a motor which is separate from that of the centrifuging member and which can therefore be operated after the beverage has been formed and dispensed, nor if the mixing chamber filling inlet is provided with suitable sealed closing means operating during centrifuging of the preparations and formation of the beverage.

In this latter case, in particular, the mixing chamber is placed under a vacuum by the centrifuging device, when it is operated in order to prepare the beverage, and the vacuum which forms there tends to favour further the evaporation of the lighter and more volatile molecules and therefore especially the molecules associated with the aroma of the soluble preparation.

The problem of avoiding a deterioration of the soluble product from which the beverage, such as coffee, milk, chocolate, tea and many other beverages, is reconstituted, and, at the same time, preserving the specific aroma of the reconstituted beverage, is particularly serious in the case of those soluble preparations which are specifically produced using processing techniques intended to preserve the characteristics of the aromatic molecules of the original primary foodstuff and a major drawback could arise from dispersion of these molecules owing to an apparatus which is not suitable for conservation thereof.

It is known that the perception of the quality of a food or a beverage presupposes that, during consumption thereof, a quantity of volatile aromatic molecules in a concentration greater than the olfactory threshold is released, so that the nasal mucous is able to perceive them in the form of a perfume or aroma.

SUMMARY OF THE INVENTION

The object of the present invention is therefore to solve the problem indicated above with regard to the reconstitution of beverages from high-quality soluble preparations in such a way as to preserve their aroma.

A further object of the invention is to prevent the deterioration of the soluble preparations.

BRIEF DESCRIPTION OF THE DRAWINGS

The invention will now be described more clearly with reference to some examples of embodiment thereof provided by way of a non-limiting example illustrated in the accompanying drawings in which.

DESCRIPTION OF THE PREFERRED EMBODIMENT

Figures 1, 1A:
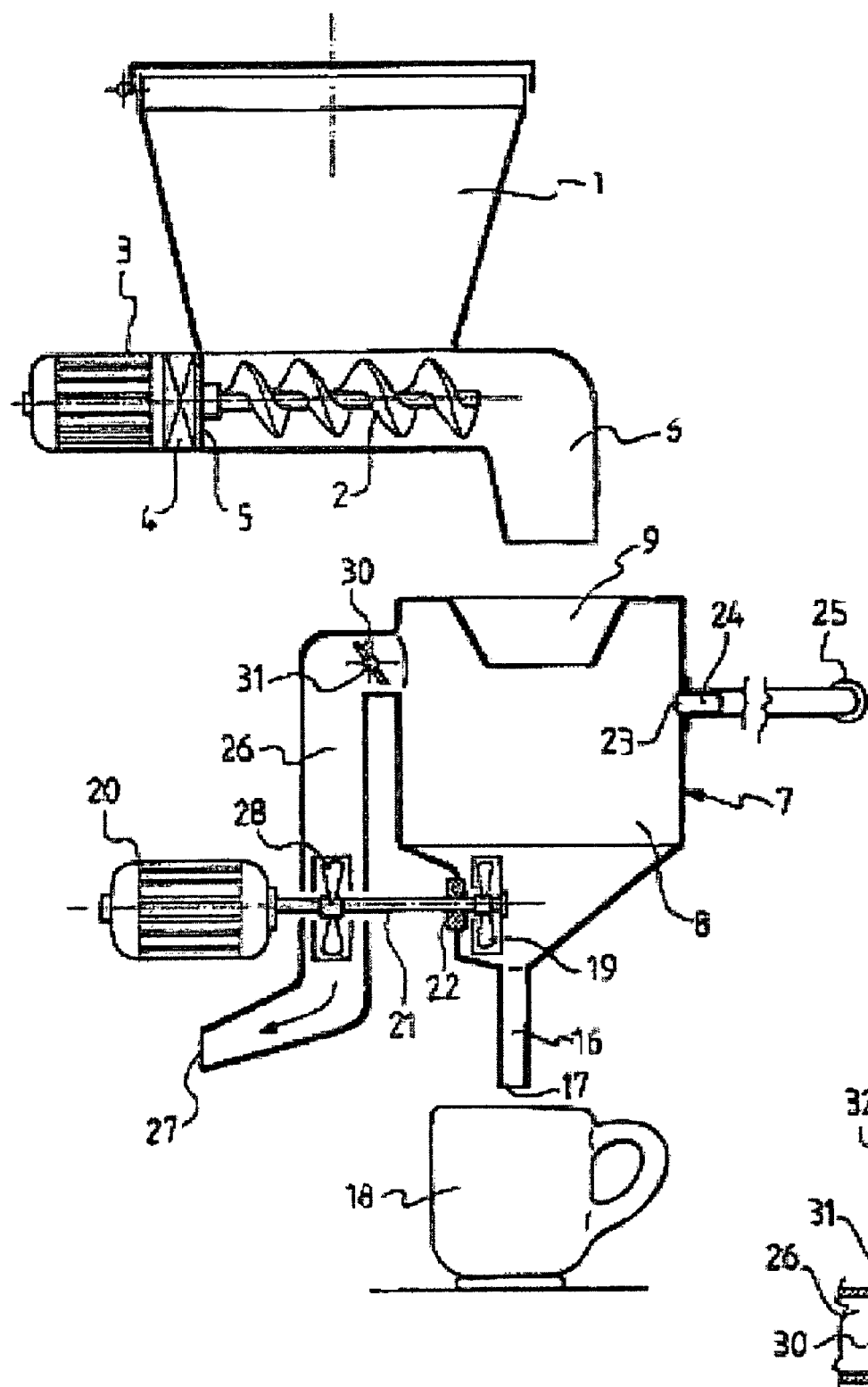
FIG. 1 shows a schematic vertical cross-section through the apparatus according to the invention, in accordance with a first embodiment thereof.
FIG. 1A shows a schematic plan view of a portion of the vapour evacuation duct with the associated intercepting means.

With reference to the abovementioned figures and in particular FIG. 1, the reference number 1 indicates a hopper suitable for forming the container for a soluble preparation which is used to reconstitute a beverage based, for example, on coffee, milk, chocolate or tea.

The bottom of the hopper 1 is occupied by a feeder screw 2, otherwise known as an "Archimedes' screw", which is rotationally operated by a motor 3 with an associated conventional gear reduction unit 4.

The feeder screw 2 operates between a closed shoulder 5 and a discharge duct 6 with a discharge opening from which a quantity of preparation is dispensed, the amount of said preparation depending on the dimensions of the feeder screw 2 and on the period of time for which it is kept rotating.

The duct 6 is positioned in vertical alignment with an underlying mixer, denoted overall by 7, at a distance from a mixing chamber 8 which is provided with a filling inlet 9.

Figure 3:
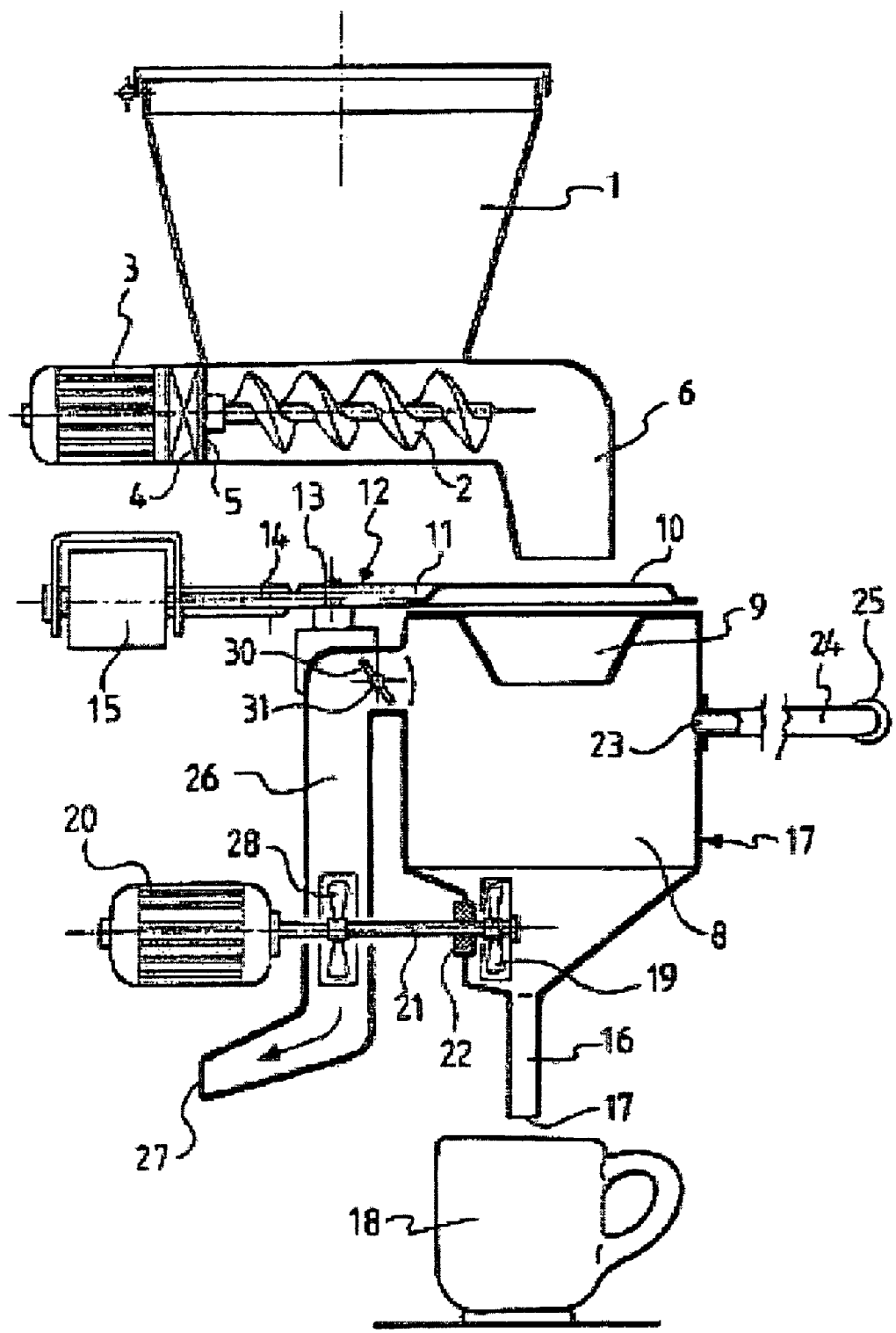
FIG. 3 shows a schematic vertical cross-section through the apparatus according to the invention, in accordance with a third embodiment thereof.
Figure 4:
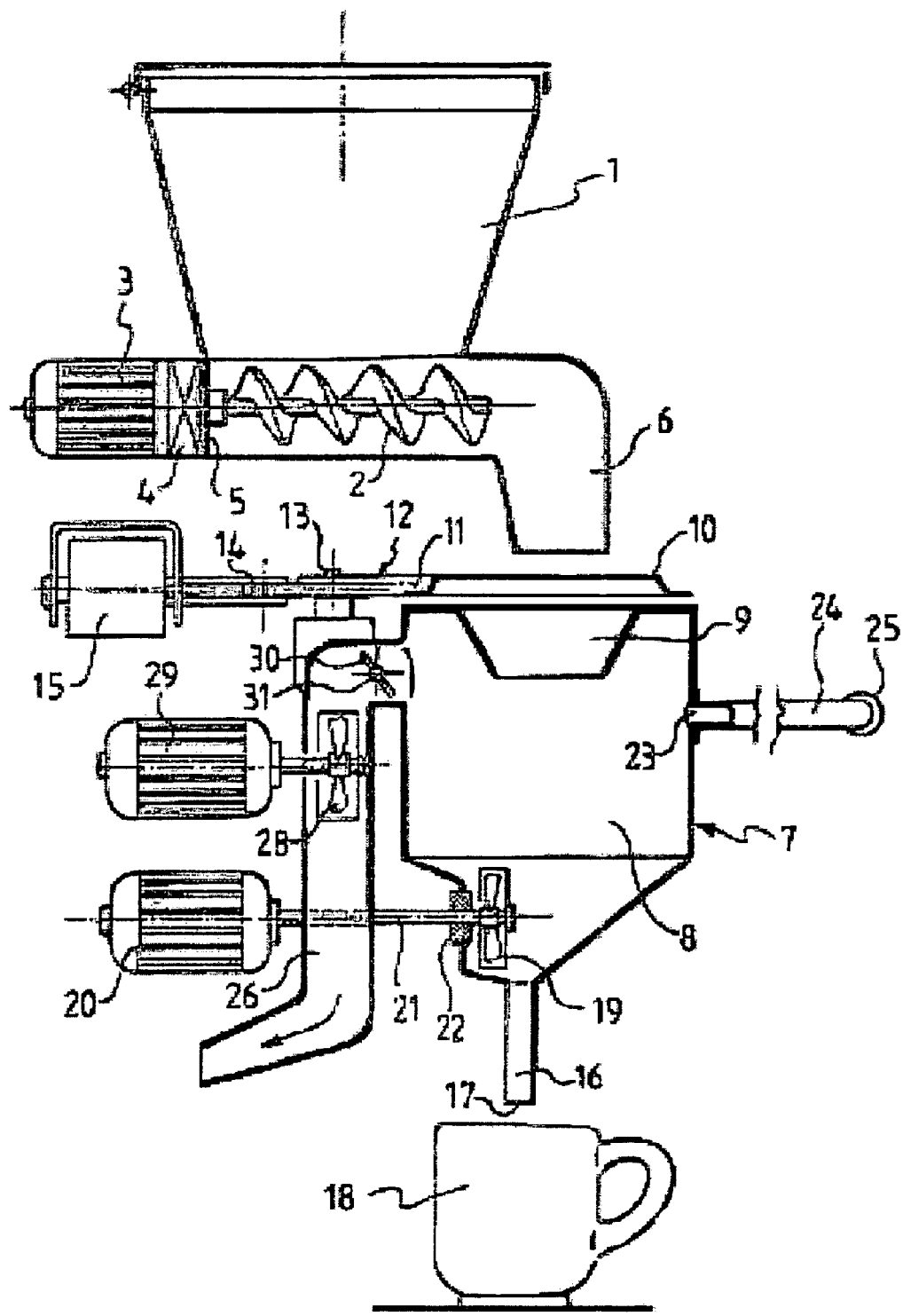
FIG. 4 shows a schematic vertical cross-section through the apparatus according to the invention, in accordance with a fourth embodiment thereof.

The latter, in the embodiments shown in FIGS. 3 and 4, has a disk-shaped member 10 fixed to the end 11 of a lever 12 which is able to pivot about a fulcrum 13, the latter being integral with the apparatus.

The opposite end 14 of the said lever 12 is engaged with the movable part of an electromagnetic actuator 15 which, as an alternative, may be of the fluid-dynamic type.

The disk member 10 is displaceable between the position where it is arranged over the filling inlet 9 of the mixing chamber and a position, angularly offset (not shown in the figures) where the filling inlet 9 is in the completely open position.

The mixing chamber 8 has a channel 16 for discharging the reconstituted beverage, said channel terminating in a dispensing opening 17 situated above a receiving cup 18.

The same mixing chamber 8 comprises a centrifuging device 19 operated by an electric motor 20 positioned outside the chamber 8.

The rotational movement of the centrifuging device 19 is transmitted by the shaft 21 which penetrates into the chamber 8 via a seal 22.

The mixing chamber 8 furthermore has an opening 23 having, leading thereto, a pipe 24 from a source 25 of solubilization liquid which may be water supplied under pressure and at the required temperature.

Alternatively, the source 25 may also supply both cold and heated milk.

Finally, the mixing chamber 8 has a duct 26 for evacuating the vapour and/or aerosol which forms inside the chamber 8 during preparation of the beverage by means of the centrifuging action exerted by the device 19 on the quantity of preparation and solubilization liquid introduced into the chamber 8.

A fan 28 is positioned inside the duct 26, the outlet of which is indicated by 27.

In accordance with the embodiments of the apparatus shown in FIGS. 1 and 3, the fan 28 is rotationally operated by the same motor 20 which operates the centrifuging device 19 and is keyed onto the same shaft 21.

Figure 2:
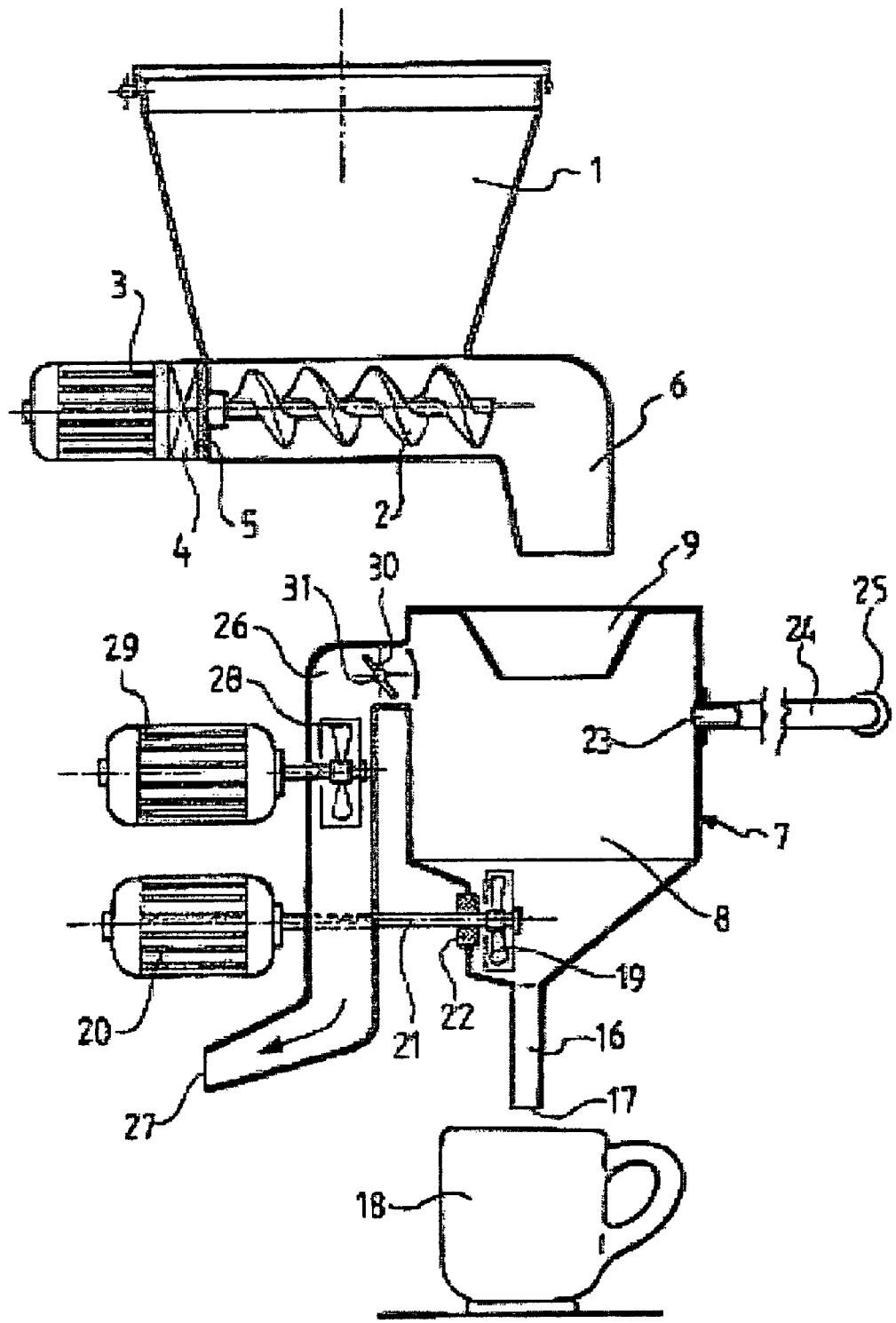
FIG. 2 shows a schematic vertical cross-section through the apparatus according to the invention, in accordance with a second embodiment thereof.

On the other hand, in accordance with the embodiments of the apparatus shown in FIGS. 2 and 4, the fan 28 is rotationally operated by a separate, dedicated, electric motor 29.

In accordance with the invention and as can be seen in all the embodiments of the apparatus shown in the drawings, the duct 26 for evacuating the vapour and/or the aerosol which forms during preparation of the beverage inside the mixing chamber 8 is provided with a valve 30 which may be displaced angularly around a pivot pin 31 by means of an associated conventional actuating device 32.

From that described above, it can be understood that with the apparatus according to the invention it is possible to preserve the aroma of the preparation introduced inside the mixing chamber 8 and at the same time perform evacuation of the vapour and any aerosol produced by the solubilization liquid introduced into the chamber 8 for reconstitution of the beverage, protecting also the conditions of the preparation which is situated inside the hopper 1.

In fact, with the apparatus according to the invention, after a quantity of soluble preparation has been introduced into the chamber 8, falling by means of gravity from the duct 6 into the filling inlet 9, and a corresponding quantity of solubilization liquid has been dispensed from the source 25, the duct 26 is closed by means of the valve 30.

In the case where the fan 28 is operated by a separate motor 29, closing of the duct 26 may be performed by simply interrupting operation of the motor 29 and therefore stopping rotation of the fan 28.

In this latter case the valve 30 could no longer be required in order to close the duct 26 and therefore could not be installed or could be kept in the open position.

In accordance with the embodiments of the apparatus shown in FIGS. 3 and 4, the filling inlet 9 may also be covered by means of the disk 10.

At this point the centrifuging device 19 is activated and starts to form the beverage without, however, creating a vacuum inside the chamber 8 since the disk 10 keeps the filling inlet 9 covered without closing it in sealed manner.

During this operation, the aromatic molecules, which are typical of the aroma of the beverage being prepared and which may be separated from the preparation, not only remain inside the chamber and in contact with the beverage without being dispersed, but are also prevented from evaporating outside the preparation since the chamber 8 is not allowed to assume a vacuum condition.

As soon as formation of the beverage has been completed and the latter has been dispensed into the cup 18 through the opening 17, the valve 30 is placed in the open position and the fan 28 starts to evacuate the vapour and/or the aerosol left inside the chamber 8, whether it be operated by the separate motor 29 or continues to remain rotating if operated by the same motor 20 of the centrifuging device 19.

The vapour and any aerosol left inside the chamber 8 are then discharged externally in a position far from the container 1 and the feeder screw 2, preventing the preparation from being able to absorb moisture.

Once evacuation of the vapour and/or the aerosol has terminated, the apparatus is ready to receive a new quantity of preparation which is introduced in the mixing chamber 8 through the filling inlet 9, after displacement of the disk 10 if the latter is present in the apparatus, for repetition of the beverage formation process.

The operating commands are generated and managed by a control unit, not shown in that of a conventional nature.

The dimensions as well as the materials may be of any nature according to requirements without thereby departing from the scope of the invention as described above and claimed below.

What is claimed is:

1. An apparatus for preparing a beverage using a soluble preparation, comprising
    a container for the soluble preparation,
    a mixer provided with a mixing chamber, said chamber having a filling inlet for receiving the soluble preparation from the container,
    at least one opening in the mixing chamber for supplying a solubilization liquid for solubilizing the preparation and forming the beverage,
    an evacuating duct connected to the mixing chamber for evacuating any vapour and/or aerosol which forms in the mixing chamber during preparation of the beverage, a suction fan provided in said evacuating duct,
a first electric motor for driving said fan,
an opening in the mixing chamber for dispensing the prepared beverage,
a centrifuging device housed inside said mixing chamber and rotationally operated by an associated second electric motor positioned outside said chamber,
means for conveying a predetermined quantity of soluble preparation from the said container to the filling inlet of said mixing chamber, said means comprising a filling duct positioned in vertical alignment with the underlying mixer,
a discharging opening on said filling duct located over said filling inlet of the mixing chamber and at a distance from the same,
means for conveying the solubilization liquid from an associated source to the respective opening of the mixing chamber,
means for opening and closing the said evacuating duct,
said opening and closing means comprising a valve and an associated actuating device.

2. An apparatus according to claim 1, wherein said first electric motor for driving said suction fan is rotationally operated by the second electric motor which operates the said centrifuging device.

3. An apparatus according to claim 1, which further comprises
a movable member for closing and opening said filling inlet of the mixing chamber
and means for displacing said movable member from a position where it keeps the filling inlet open during introduction of a quantity of soluble preparation and a position where it is over said inlet and keeps it closed not in sealed manner during formation of the beverage and vice versa.

* * * * *